United States Patent
Hum et al.

(10) Patent No.: US 7,721,050 B2
(45) Date of Patent: *May 18, 2010

(54) RE-SNOOP FOR CONFLICT RESOLUTION IN A CACHE COHERENCY PROTOCOL

(75) Inventors: Herbert H. Hum, Portland, OR (US); Robert Beers, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 266 days.

This patent is subject to a terminal disclaimer.

(21) Appl. No.: 11/480,102

(22) Filed: Jun. 30, 2006

(65) Prior Publication Data

US 2008/0005487 A1    Jan. 3, 2008

(51) Int. Cl.
*G06F 12/00*    (2006.01)

(52) U.S. Cl. .................. 711/141; 711/143; 711/144; 711/145; 711/146; 711/147; 711/150

(58) Field of Classification Search ............... 711/141, 711/143, 144, 145–146, 147, 150
See application file for complete search history.

(56) References Cited

U.S. PATENT DOCUMENTS

| | | | | |
|---|---|---|---|---|
| 5,966,729 | A * | 10/1999 | Phelps | 711/146 |
| 6,009,488 | A | 12/1999 | Kavipurapu | |
| 6,631,401 | B1 * | 10/2003 | Keller et al. | 709/213 |
| 6,631,448 | B2 * | 10/2003 | Weber | 711/141 |
| 6,704,842 | B1 * | 3/2004 | Janakiraman et al. | 711/141 |
| 6,922,756 | B2 | 7/2005 | Hum et al. | |
| 6,954,829 | B2 * | 10/2005 | Beers et al. | 711/141 |
| 7,107,409 | B2 * | 9/2006 | Glasco | 711/141 |
| 7,536,515 | B2 * | 5/2009 | Spink et al. | 711/141 |
| 2004/0122966 | A1 | 6/2004 | Hum et al. | |
| 2004/0123045 | A1 | 6/2004 | Hum et al. | |
| 2004/0123047 | A1 | 6/2004 | Hum et al. | |
| 2005/0144400 | A1 | 6/2005 | Hum et al. | |
| 2005/0160230 | A1 * | 7/2005 | Doren et al. | 711/141 |
| 2005/0237941 | A1 | 10/2005 | Hum et al. | |
| 2005/0240734 | A1 | 10/2005 | Batson et al. | |
| 2006/0053257 | A1 * | 3/2006 | Sistla et al. | 711/143 |
| 2008/0005483 | A1 * | 1/2008 | Spink et al. | 711/141 |

OTHER PUBLICATIONS

U.S. Appl. No. 11/447,384, filed Jun. 5, 2006, Hum et al.
Office Action for U.S. Appl. No. 11/479,576 mailed Jun. 16, 2008, Whole Document.
Office Action for U.S. Appl. No. 11/479,179 mailed Apr. 21, 2008, Whole Document.
USPTO, "42P23773 Notice of Allowance Mailed Dec. 24, 2008 for U.S. Appl. No. 11/479,576", (Dec. 24, 2008), Whole Document.
USPTO, "42P23773 OA Mailed Jun. 16, 2008 for U.S. Appl. No. 11/479,576", (Jun. 16, 2008), Whole Document.

(Continued)

*Primary Examiner*—Tuan V Thai
*Assistant Examiner*—Zhuo H Li
(74) *Attorney, Agent, or Firm*—Blakely, Sokoloff, Taylor & Zafman LLP

(57) ABSTRACT

In a cache coherency protocol a re-snoop may be utilized to resolve a data request conflict condition. The re-snoop may avoid a conflict resolution phase, which may reduce system inefficiencies.

17 Claims, 7 Drawing Sheets

OTHER PUBLICATIONS

USPTO, "42P23774 Notice of Allowance Mailed Nov. 3, 2008 for U.S. Appl. No. 11/479,179", (Nov. 3, 2008), Whole Document.

USPTO, "42P23774 OA Mailed Apr. 21, 2008 for U.S. Appl. No. 11/479,179", (Apr. 21, 2008), Whole Document.

"Notice of Allowance for U.S. Appl. No. 12/351,737", (Feb. 19, 2010), Whole Document.

"First Office Action for U.S. Appl. No. 12/351,737", (Jun. 10, 2009), Whole Document.

* cited by examiner

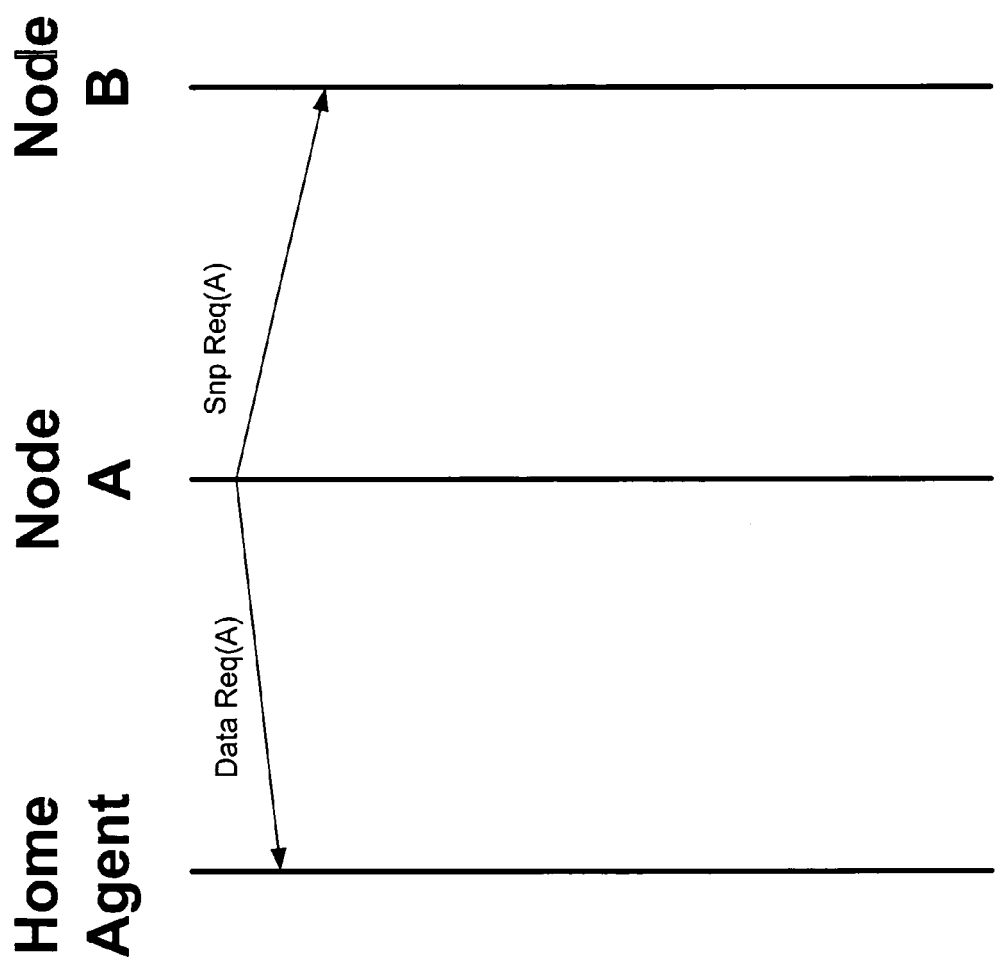

RE-SNOOP FOR CONFLICT RESOLUTION IN A CACHE COHERENCY PROTOCOL

RELATED APPLICATIONS

The present U.S. patent application is related to the following U.S. patent applications filed concurrently:

(1) Application Ser. No. 11/479,179 filed Jun. 30, 2006, entitled "REQUESTER-GENERATED FORWARD OPERATION IN A CACHE COHERENCY PROTOCOL" and (2) Application Ser. No. 11/479,576 filed Jun. 30, 2006, entitled "REPEATED CONFLICT ACKNOWLEDGEMENTS IN A CACHE COHERENCY PROTOCOL."

TECHNICAL FIELD

Embodiments of the invention relate to a cache coherency protocol. More particularly, embodiments of the invention relate to resolution of conflicts in a system having multiple caching agents.

BACKGROUND

When an electronic system includes multiple cache memories, the validity of the data available for use must be maintained. This is typically accomplished by manipulating data according to a cache coherency protocol. As the number of caches and/or processors increases, the complexity of maintaining cache coherency also increases.

When multiple components (e.g., a cache memory, a processor) request the same block of data the conflict between the multiple components must be resolved in a manner that maintains the validity of the data. Current cache coherency protocols typically have a single component that is responsible for conflict resolution. However, as the complexity of the system increases, reliance on a single component for conflict resolution can decrease overall system performance.

BRIEF DESCRIPTION OF THE DRAWINGS

Embodiments of the invention are illustrated by way of example, and not by way of limitation, in the figures of the accompanying drawings in which like reference numerals refer to similar elements.

FIGS. 3A-3D illustrate a technique for resolution of a conflict condition utilizing re-snoops.

DETAILED DESCRIPTION

Techniques for distributed cache coherency conflict resolution in a multi-node system are described. In the following description, numerous specific details are set forth. However, embodiments of the invention may be practiced without these specific details. In other instances, well-known circuits, structures and techniques have not been shown in detail in order not to obscure the understanding of this description.

The cache coherency protocol described herein provides a snooping protocol without the limitations of a single, serializing bus. The protocol relies on nodes with cached copies of data to maintain coherency. In one embodiment, nodes are interconnected through point-to-point links between caching agents. In one embodiment, the cache coherency protocol may provide distributed conflict resolution by having nodes identify potential conflicts and involve the Home node in the resolution process. The Home node may participate in every transaction without being on the critical path in order to resolve conflicts.

The cache coherency protocol involves broadcasting an initial request to all peer nodes as well as the Home node. A conflict will be detected if each node monitors for conflicts after making a request. Because all nodes must respond to a broadcast request either by supplying the data or indicating they do not have a copy, the response can include an indication of a conflict, so conflicting nodes will detect the conflict.

Under certain conditions a requesting node may have received the requested data and acknowledged receipt to the Home node. However, before a completion message is received from the Home node, a conflicting request may be received from a peer node. This may be referred to as a "late conflict" condition. Techniques for resolution of the late conflict condition are described herein.

Figure 1:
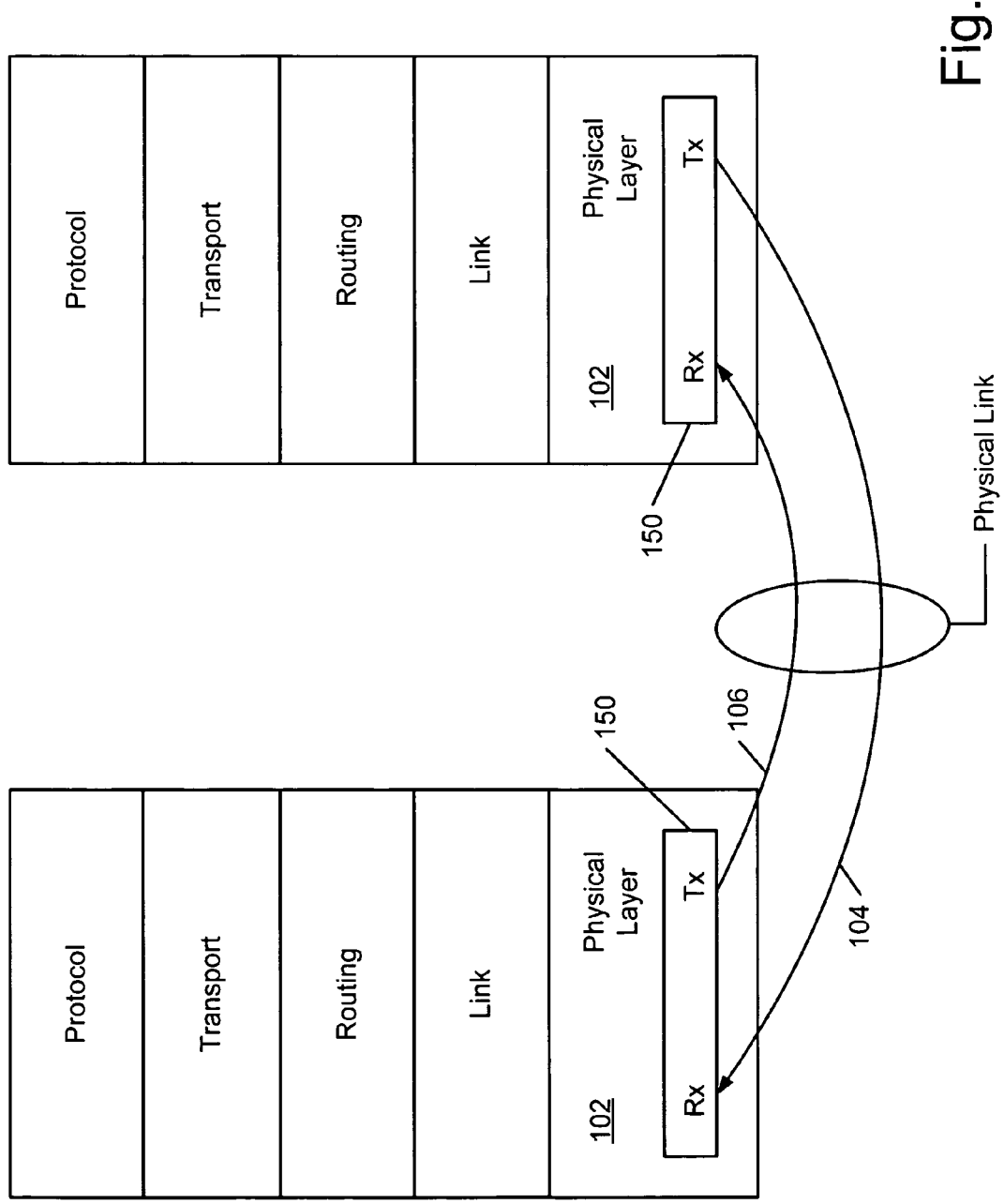
FIG. 1 is a block diagram of one embodiment of an apparatus for a physical interconnect.

FIG. 1 is a block diagram of one embodiment of an apparatus for a physical interconnect. In one aspect, the apparatus depicts a physical layer for a cache-coherent, link-based interconnect scheme for a processor, chipset, and/or IO bridge components. For example, the physical interconnect may be performed by each physical layer of an integrated device.

Specifically, the physical layer may provide communication between two ports over a physical interconnect comprising two uni-directional links. Specifically, one uni-directional link 104 from a first transmit port 150 of a first integrated device to a first receiver port 150 of a second integrated device. Likewise, a second uni-directional link 106 from a first transmit port 150 of the second integrated device to a first receiver port 150 of the first integrated device. However, the claimed subject matter is not limited to two uni-directional links.

Figure 2:
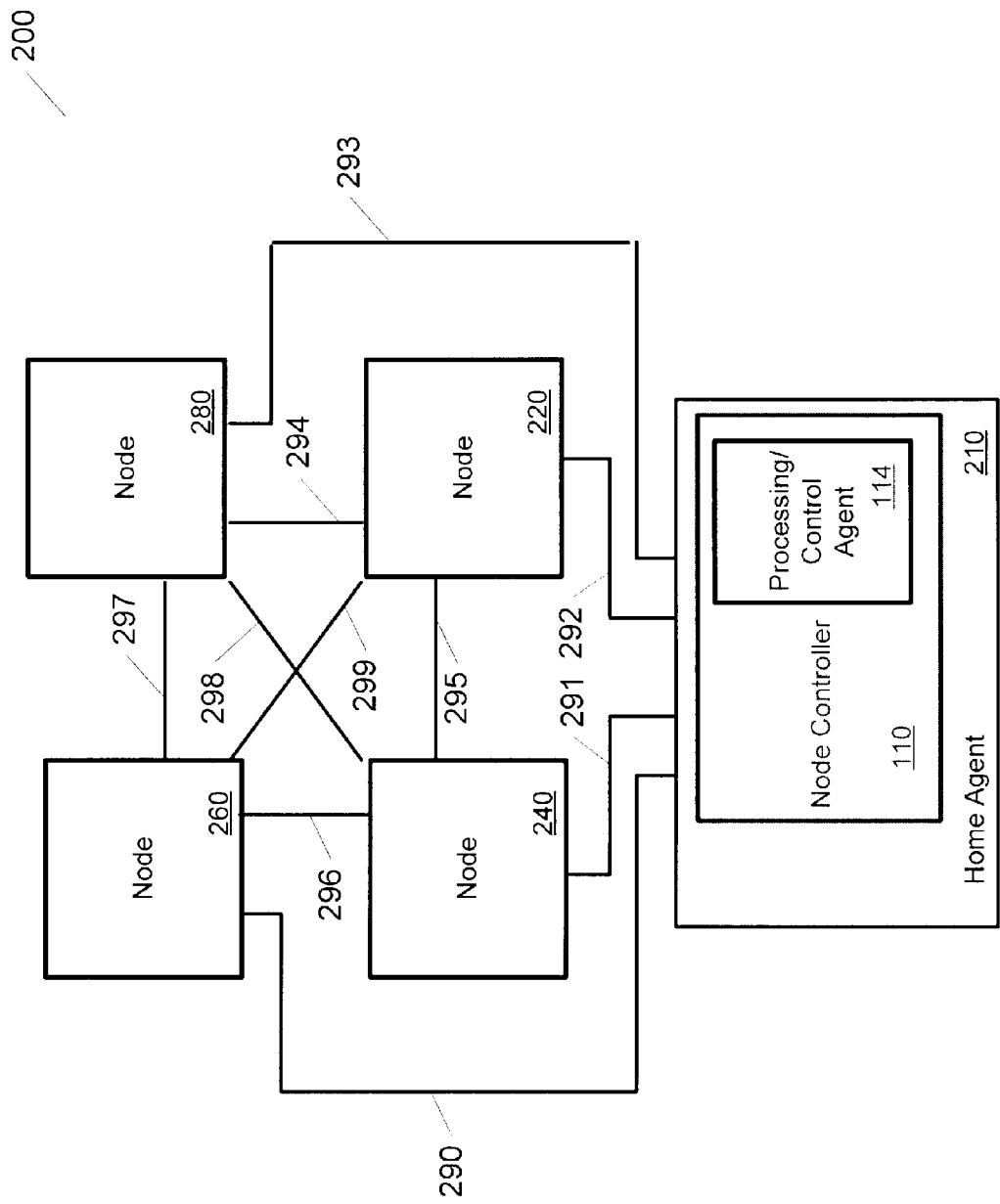
FIG. 2 is a block diagram of a group of nodes interconnected with a home agent.

FIG. 2 is a block diagram of a group of nodes interconnected with a home agent. The example of FIG. 2 includes nodes and a home agent. However, any number of nodes may be coupled with a home agent. The nodes and home agent may be referred to as a "cluster" that may be a part of a larger system. In one embodiment, one or more of the nodes may have a memory system that may include any type of non-cache memory, for example, dynamic random access memory (DRAM), static random access memory (SRAM), etc.

The four nodes (220, 240, 260 and 280) may be any type of system component having a cache memory, for example, a processor. In one embodiment, the nodes and home agent may be interconnected via multiple point-to-point links (290, 291, 292, 293, 294, 295, 296, 297, 298, and 299) as described with respect to FIG. 1.

In one embodiment, node controller 110 may include processing/control agent 114. Processing/control agent 114 may provide all or a portion of the functionality provided by node controller 110. Processing/control agent 114 may be implemented as hardware, software, firmware, or any combination thereof. Node controller 110 may also include additional circuits and functionality. In one embodiment, node controller 110 may be a gateway for communication beyond the cluster. Node controller 110 may also operate as a proxy home or caching agent for the home agents of remote clusters, if any. Node controller 110 may also serve as a proxy for the caching agents in the local cluster.

FIG. 3A is a conceptual illustration of a node requesting data in a multi-node system. FIG. 3A includes two peer nodes (Node A and Node B) and one Home Agent for reasons of simplicity of description only. A system may have any number of peer nodes and any number of Home Agents. In one embodiment a Home Agent may operate as a proxy for multiple peer nodes when interacting with remote nodes.

To request a block of data, Node A may transmit a Data Request (Data Req(A)) message to the Home Agent and a Snoop Request (SnpReq(A)) message to all peer nodes. The requested block of data may be any size block of data, for example, a cache line or a byte of data.

Figure 3B:
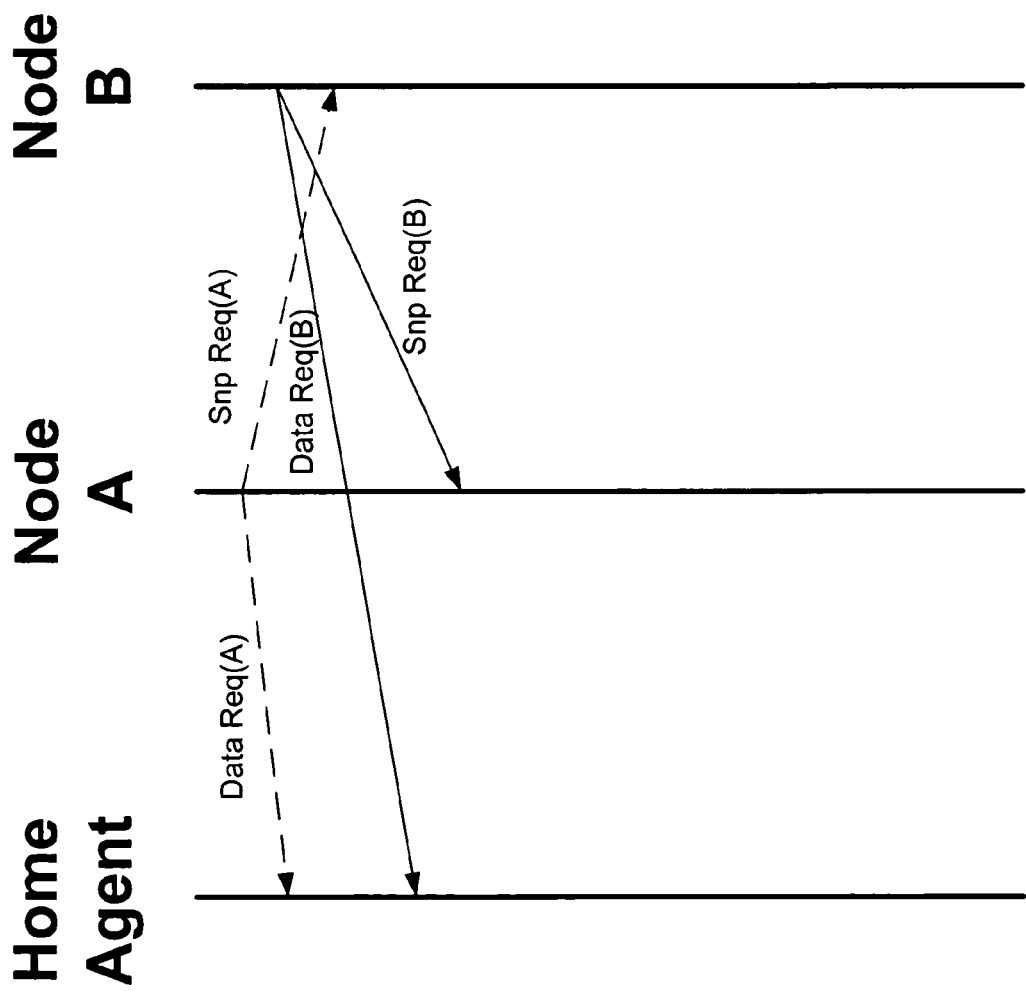

FIG. 3B is a conceptual illustration of a second peer node generating a conflicting request for data. In the illustration of FIG. 3B, the messages described with respect to FIG. 3A are illustrated with dashed lines while the subsequent messages described with respect to FIG. 3B are illustrated with solid lines.

After sending the Response message, but before Node A has received ownership of the requested data, Node B may request the block of data by sending a Data Request (Data Req(B)) message to the Home Agent and a Snoop Request (SnpReq(B)) message to all peer nodes.

Figure 3C:
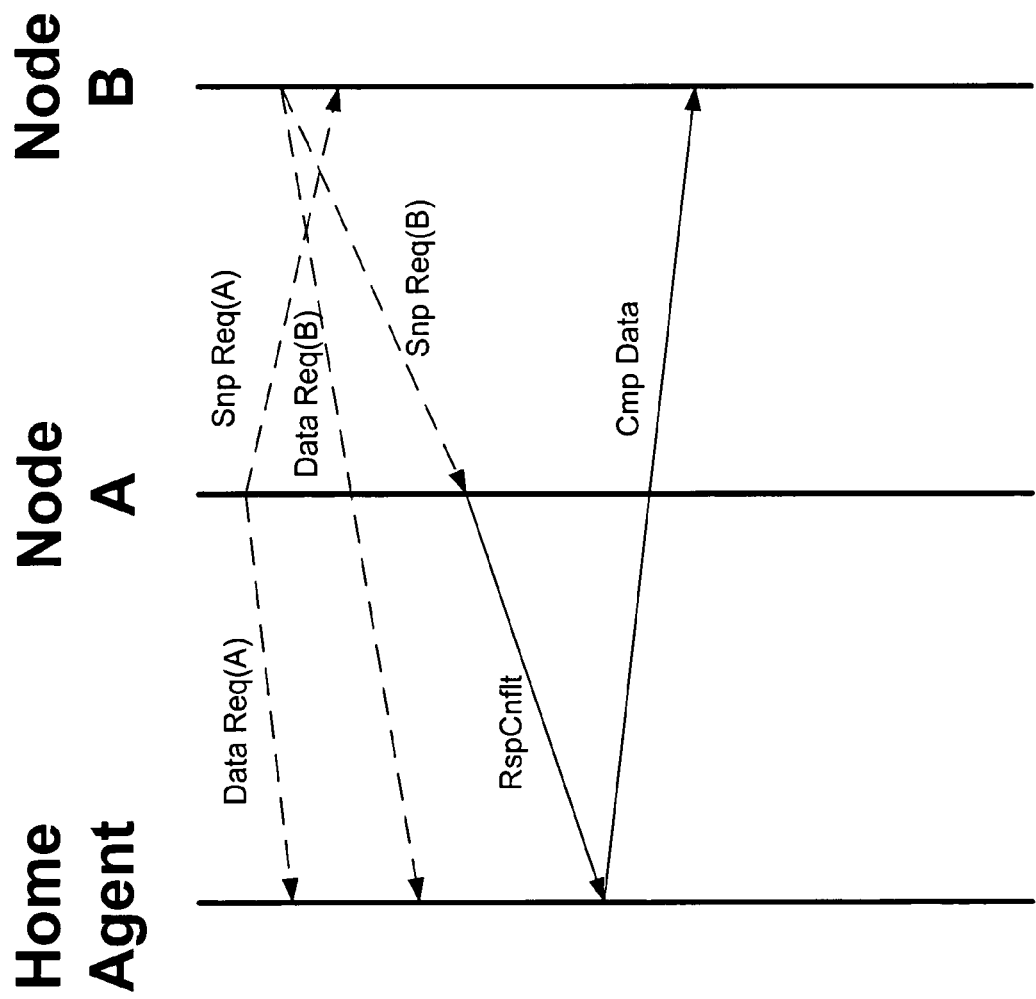

FIG. 3C is a conceptual illustration of the Home Agent completing the second request without forwarding. In response to receiving the Snoop Request message from Node B, Node A may send a Response Conflict (RspCnflt) message to the Home Agent to indicate a conflicting request. In response to the Response Conflict message, the Home Agent may complete the request from Node B by sending a Complete with Data (Cmp Data) message to Node B.

Figure 3D:
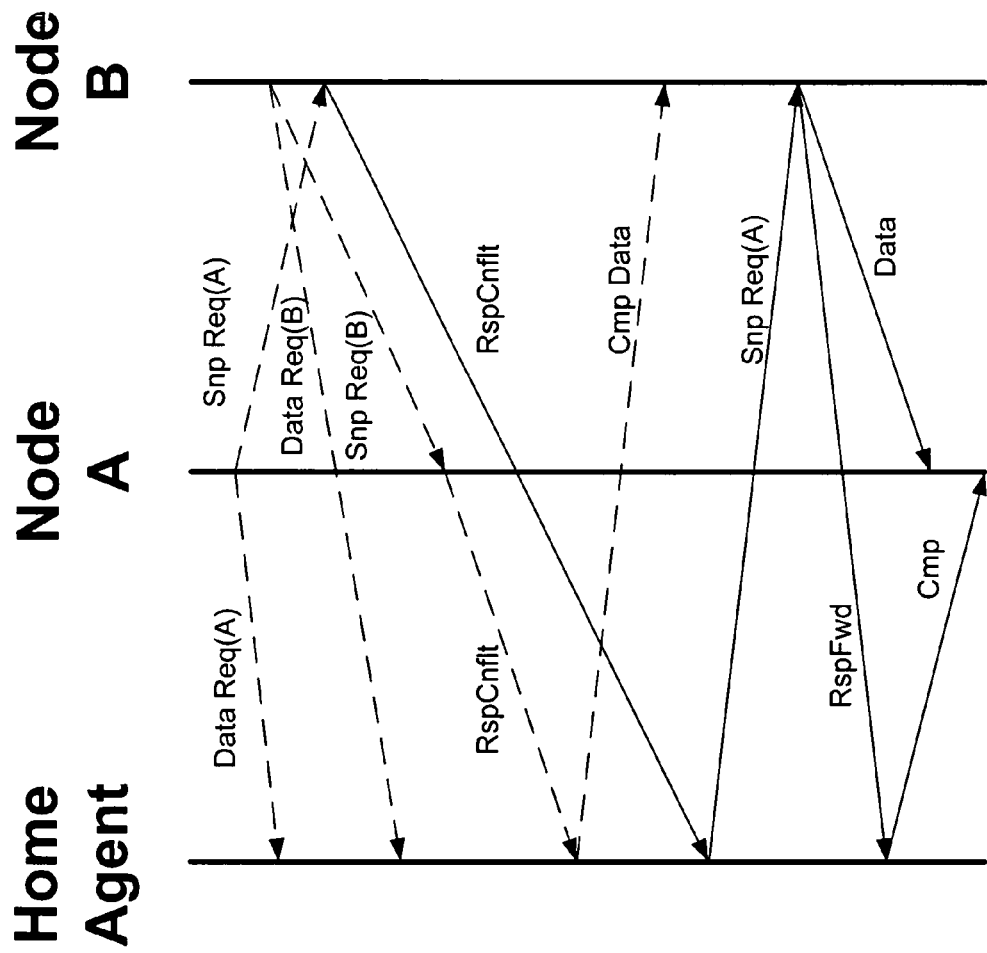

FIG. 3D is a conceptual illustration of a re-snoop in response to a late conflict condition. After completing the request of Node B, the Home Agent may receive a Response Conflict message from Node B corresponding to the request by Node A for the block of data. In response to this request, the Home Agent may send a Snoop Request (SnpReq(A)) message to Node B to cause Node B to respond to Node A in terms of a Snoop Response. This may be referred to as a re-snoop because a Snoop Request with Node A as the destination is reissued to Node B.

In response to the Snoop Request message, Node B may send a Response Forward (RspFwd) message to the Home Agent to indicate that the requested data is (or will be) forwarded to Node A. Node B also sends the data to Node A. In response to the Response Forward message, the Home Agent may send a Complete (Cmp) message to Node B to complete the request phases for Node A and Node B with respect to the requested block of data.

Figure 4:
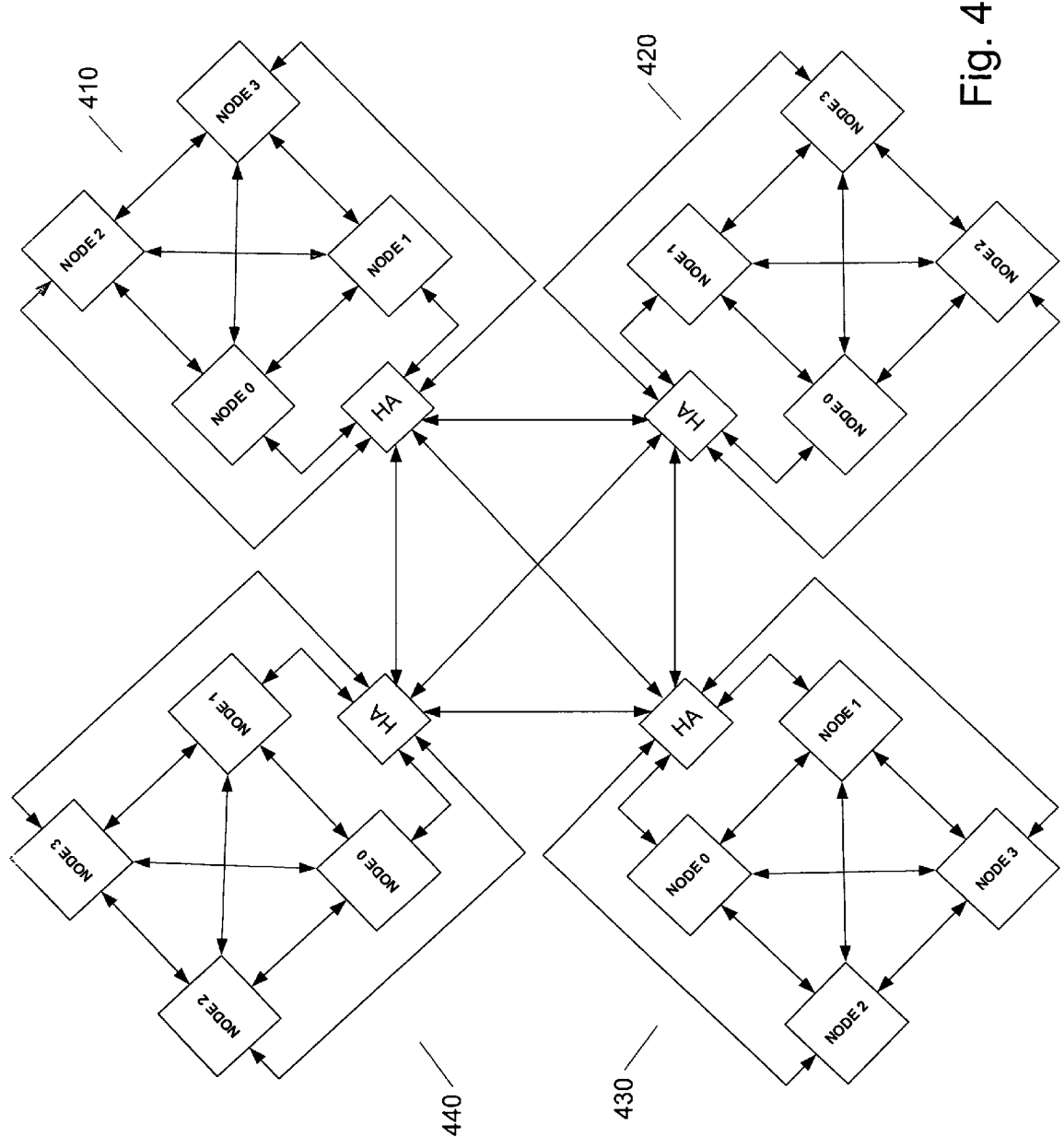
FIG. 4 is a block diagram of a hierarchical system having multiple home agents.

FIG. 4 is a block diagram of a hierarchical system having multiple home agents. FIG. 4 illustrates an example architecture of interconnecting four home agents with their corresponding nodes. In one embodiment, the home agents may interact utilizing the same messaging protocol as is used between the nodes.

In one embodiment, each cluster (410, 420, 430, 440) is configured similarly to the cluster of FIG. 2 where a group of nodes are interconnected via point-to-point links with a home agent. The home agents may also be interconnected via point-to-point links. This allows a home agent to represent a group of nodes to a larger system in a hierarchical manner. The architecture may be further expanded by including a home agent to represent clusters 410, 420, 430 and 440 to other groups of clusters.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
receiving at a home agent in a multi-node system a conflict message from a first peer node of two peer nodes in the multi-node system, the conflict message indicating a conflict between a first snoop message sent from the first peer node to a second peer node of the two peer nodes and a second snoop message received at the first peer node from the second peer node, wherein the conflict message is sent from the first peer node in response to receiving the second snoop message;
in response to receiving the conflict message,
the home agent causing data requested by the first and second snoop requests to be sent to the second peer node, and
reissuing to the second peer node the first snoop message sent from the first peer node to the second peer node, including the home node sending the reissued first snoop message to the second peer node; and
the second peer node performing a snoop response based on the reissued first snoop message sent from the home node.

2. The method of claim 1 wherein the reissuing to the second peer node the first snoop message is further in response to a second conflict message received from the second peer node.

3. The method of claim 1 wherein each node in the multi-node group is interconnected with a bi-directional point-to-point link and each node communicates with each other node in the multi-node group.

4. An apparatus comprising:
a first peer node having a cache memory to request a block of data not stored in the cache memory by sending a first data request message corresponding to the block of data and a first snoop request message corresponding to the block of data;
a second peer node having a cache memory to receive the snoop request message from the first peer node, the second peer node to send a second data request message and a second snoop request message corresponding to the block of data before the first data request message is resolved; and
a home agent to receive the first data request message from the first peer node and the second data request message from the second peer node, the home agent to cause the requested block of data to be sent to the second peer node, the home agent further to reissue to the second peer node the snoop request message received by the second peer node from the first peer node, the reissuing in response to the first data request message and the second data request message, wherein the second peer node further to perform a snoop response based on the reissued snoop message from the home node, wherein the snoop response causes the requested block of data to be sent from the cache memory of the second peer node to the first peer node.

5. The apparatus of claim 4 wherein the first peer node and the second peer node are interconnected with a first bi-directional point-to-point link, the second peer node and the home agent are interconnected with a second bi-directional point-to-point link, and the first peer node and the home agent are interconnected with a third bi-directional point-to-point link.

6. The apparatus of claim 4 further comprising:
   a remote home agent to represent one or more remote nodes; and
   a bi-directional point-to-point link to couple the remote home agent to the home agent.

7. The apparatus of claim 4 wherein the second peer node sends a first conflict message to the home agent in response to receiving the snoop request message from the first peer node.

8. The apparatus of claim 7 wherein the first peer node sends a second conflict message to the home agent in response to receiving the snoop request message from the second peer node.

9. The apparatus of claim 8 wherein the snoop response causes the requested block of data to be sent to the peer node from which a conflict message is received first in time.

10. The apparatus of claim 9 wherein the reissuing to the second peer node the snoop request message includes sending the reissued snoop request message to the peer node from which a conflict message is received second in time.

11. A system comprising:
    a first peer node having a cache memory and a dynamic random access memory to request a block of data not stored in the cache memory by sending a first data request message corresponding to the block of data and a first snoop request message corresponding to the block of data;
    a second peer node having a cache memory and a dynamic random access memory to receive the snoop request message from the first peer node, the second peer node to send a second data request message and a second snoop request message corresponding to the block of data before the first data request message is resolved; and
    a home agent to receive the first data request message from the first peer node and the second data request message from the second peer node, the home agent to cause the requested block of data to be sent to the second peer node, the home agent further to reissue to the second peer node the snoop request message received by the second peer node from the first peer node, the reissuing in response to the first data request message and the second data request message, wherein the second peer node further to perform a snoop response based on the reissued snoop message from the home node, wherein the snoop response causes the requested block of data to be sent from the second peer node to the first peer node.

12. The system of claim 11 wherein the first peer node and the second peer node are interconnected with a first bi-directional point-to-point link, the second peer node and the home agent are interconnected with a second bi-directional point-to-point link, and the first peer node and the home agent are interconnected with a third bi-directional point-to-point link.

13. The system of claim 11 further comprising:
    a remote home agent to represent one or more remote nodes; and
    a bi-directional point-to-point link to couple the remote home agent to the home agent.

14. The system of claim 11 wherein the second peer node sends a first conflict message to the home agent in response to receiving the snoop request message from the first peer node.

15. The system of claim 14 wherein the first peer node sends a second conflict message to the home agent in response to receiving the snoop request message from the second peer node.

16. The system of claim 15 wherein the snoop response causes the requested block of data to be sent to the peer node from which a conflict message is received first in time.

17. The system of claim 16 wherein the reissuing to the second peer node the snoop request message includes sending the reissued snoop request message to the peer node from which a conflict message is received second in time.

* * * * *